United States Patent
Lee et al.

(10) Patent No.: US 6,745,185 B2
(45) Date of Patent: Jun. 1, 2004

(54) SYSTEM AND METHOD FOR ONLINE AGENCY SERVICE OF DATA MINING AND ANALYZING

(75) Inventors: Chung-I Lee, Tu-Chen (TW); Xiao Fang Geng, Shenzhen (CN); Xiu Ming Duan, Shenzhen (CN); Cai Yang Luo, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 325 days.

(21) Appl. No.: 09/916,081

(22) Filed: Jul. 25, 2001

(65) Prior Publication Data

US 2002/0083066 A1 Jun. 27, 2002

(30) Foreign Application Priority Data

Dec. 26, 2000 (TW) .................................... 89127902 A

(51) Int. Cl.$^7$ .............................................. G06F 17/30
(52) U.S. Cl. .............................. 707/6; 707/3; 707/10; 707/101
(58) Field of Search ........................... 705/26; 709/206, 709/227, 223; 707/1, 100, 6, 101, 200, 10, 124, 3, 7

(56) References Cited

U.S. PATENT DOCUMENTS

| 6,377,993 B1 | * | 4/2002 | Brandt et al. ................ 709/227 |
| 6,405,195 B1 | * | 6/2002 | Ahlberg ........................ 707/4 |
| 6,510,457 B1 | * | 1/2003 | Ayukawa et al. ........... 709/217 |
| 6,519,598 B1 | * | 2/2003 | Nishizawa et al. ........... 707/10 |
| 2002/0046273 A1 | * | 4/2002 | Lahr et al. .................. 709/224 |

* cited by examiner

*Primary Examiner*—Jean M. Corrielus
(74) *Attorney, Agent, or Firm*—Wei Te Chung

(57) ABSTRACT

A system and method for an online agency service of data mining and analyzing is disclosed. The system and method can automatically fetch and analyze data stored in a remote source database (10) based on a data analysis request originating from a client site (3). Initially, the client site (3) sends a data analysis request to the service provider (2). The service provider (2) converts the data analysis request into a standard format of query information, and searches the source database (10). A plurality of data records are searched and written into a local database (23) contained in the service provider (2). Finally, the service provider (2) analyzes the data stored in the local database, and generates a search report which is then sent to the client site (3).

7 Claims, 9 Drawing Sheets

[Search Summary]

Results of search in 1999-2000 for: ICL/G06F-*/*:19984 patents.

Hits 1 through 50 of 19984

| Refine Search | ICL/G06F |

Pat. No.     Title 1. 6,158,049 User transparent mechanism for profile feedback optimization
2. 6,158,048 Method for eliminating common subexpressions from java byte codes
3. 6,158,047 Client/server system for fast, user transparent and memory efficient computer language translation
4. 6,158,046 Computer device and method for processing data utilizing pseudoinstruction words
5. 6,158,045 Portable debugging services utilizing a client debugger object and a server debugger object with flexible addressing support
6. 6,158,044 Proposal based architecture system
7. 6,158,043 Signal processing apparatus and method
8. 6,158,042 Method of counting bits

FIG. 5

```
<A HREF="http://patents.uspto.gov/cgi-bin/ifetch4?ENG+PATBIB-1999-2000+0+990662+0+1+165850+F+1+1+1+19984+1+1+CL%2fg06f"
>B>6,158,049</B></A>User transparent mechanism for profile feedback optimization</A>
</TD>
</TR>
<TR>
<TD VALIGN="TOP" ALIGN="RIGHT">2.</TD>
<TD COLSPAN="2" VALIGN="TOP" ALIGN="LEFT" WIDTH="532">
<A HREF="http://patents.uspto.gov/cgi-bin/ifetch4?ENG+PATBIB-1999-2000+0+990662+0+1+165849+F+2+1+19984+1+1+CL%2fg06f"
>B>6,158,048</B></A>Method for eliminating common subexpressions from java byte codes</A>
```

FIG. 6

```
<HR>
<TABLE><TR><TD VALIGN="TOP">Inventors:</TD><TD VALIGN=TOP><B>Goodwin;David W. </B>
(Waltham, MA);
<B>Colm;Robert S. </B>
(Salem, NH);
<B>Lomney;Paul G. </B>
(Concord, MA);
<B>Rubin;Norman</B>
(Cambridge, MA).
</TD>
</TR>
<TR><TD VALIGN=TOP>Assignee:</TD><TD VALIGN=TOP><B>Compaq Computer Corporation</B>
```

FIG. 8

SYSTEM AND METHOD FOR ONLINE AGENCY SERVICE OF DATA MINING AND ANALYZING

BACKGROUND OF THE INVENTION

1. Field of the Invention

The present invention relates to a system and method for an online agency service of data mining and analyzing, especially a system and method which may provide an online agency service of data mining and analyzing upon receiving clients' requirements.

2. The Prior Art

Knowledge becomes more and more important in the knowledge economic era. Knowledge is a synergy result obtained from all aspects of flowing information and contains experience, value, and information expressed by words. The information is obtained by classifying, integrating, and analyzing data originating from papers, journals, or Web sites in order to be a readable and understandable reference for users. It is a focus of industry to precisely and quickly extract useful information or knowledge from huge amounts of data.

The developing internet has become the most important and the most rapid tool for querying of data. However, the data available from the internet is too voluminous to be searched easily. Therefore, many searching engines or searching tools are provided for users to find their required information via key words. The searching tools or engines may narrow the searching scopes to a more specific region. However, the specific region usually is still too big for the user to search conveniently. It is difficult for a user to extract specific information from a hundred or a thousand records of data. Moreover, being limited by the bandwidth of their internet connection, many downloads are very slow and may even disconnected during downloading, thus adversely affecting the total operation speed.

Referring to FIG. 1, a conventional service model for providing a data analysis is shown. A client at a client computer 3 searches his/her required data from a source database 10 located at a remote site via the internet, and downloads the required data from the client computer 3. Normally the searched data are huge, but not processed or analyzed. It takes time to process and analyze the huge data manually. Some software providers 2 can provide the client with a software system for Processing and analyzing a specific field of searched data. For example, these software providers 2 are the Aurigin company with its software product IPAM System and the Wisdomain company with its parent analysis software product PatentLab-II. When the client wants to analyze the searched data, he/she needs to buy or download the related data analysis software from the software provider 2 and install the data analysis software on the client computer 3 for analyzing the searched data. This is a standard client/server service model. Accordingly, the conventional data analysis model needs the following steps performed.

(i) The client buys (or downloads for free) the data analysis software from the software provider.

(ii) The client buys and downloads the searched data from the database owner.

(iii) The client analyzes the searched data by utilizing the data analysis software.

The above data analysis service has some drawbacks. Firstly, the client may only be concerned with the analysis result, not the procedure. However, the client has to spend time to do the analysis, thus wasting time. Moreover, the client may have difficulty doing the analysis using the software, thus causing error. Secondly, the data analysis software bought from the software provider may require updating frequently, thus increasing costs. Thirdly, the client has to buy the searched data from the database owner, which may be useless for the client because the client only needs the final analysis result not the huge amount of searched data. Therefore, the conventional analysis service wastes the client's time and money.

It is desired to provide a new method and system for a data analyzing service.

SUMMARY OF THE INVENTION

The primary purpose of the present invention is to provide a convenient system and method for an online agency service of data mining and analyzing.

Another purpose of the present invention is to provide a system and method of an online agency service for data mining and analyzing so that a client can send a request for data analysis to a service provider via the internet and the service provider can send back the final analysis to the client after performing mining and analysis.

According to one aspect of the present invention, there is provided a system for an online agency service of data mining and analyzing. The system comprises; a source database having source data stored therein; a service provider having modules for data mining and analyzing; and a client site comprising a module for sending and receiving information. In operation, the client site sends a data analysis request to the service provider. The service provider fetches source data from the source database based on the data analysis request, analyzes the fetched source data, and presents an analysis report to the client site.

BRIEF DESCRIPTION OF THE DRAWINGS

FIG. 5 is a partial view of a search result shown in a Web page using "ICL/G06F" as the key word for searching from the database of the United States Patent and Trademark Office Web site;

FIG. 6 is a portion of the source codes of the Web page shown in FIG. 5;

FIG. 8 is a partial view of the source codes of the Web page of FIG. 7.

DETAILED DESCRIPTION OF THE PREFERRED EMBODIMENT

For better understanding the present invention, some terms used in the subsequent description are defined herein.

Hyperlink: A predefined linkage between one object and another. The link is displayed either as text or as an icon. On World Wide Web pages, a text hyperlink displays as underlined text typically in blue, while a graphical hyperlink is a small graphics image. When the hyperlink text or icon is clicked by the mouse, the linked text or graphics image will be linked and shown on the screen.

Hypertext: A linkage which is built between related text. Links can be text only, in which case they are underlined, or they can be represented as an icon of any size or shape.

Internet: A large network made up of a number of smaller networks. Today, the Internet has become commercialized into a worldwide information highway, providing information on every subject known to humankind.

HTML: Hypertext Markup Language, a document format used on the World Wide Web and also a language allowing programming codes for defining letter forms, fonts, graphics, or hypertext linkages existing in the text. Web pages are built with HTML tags, or codes, embedded in the text. HTML defines the page layout, fonts and graphic elements as well as the hypertext links to other documents on the Web.

URL: Universal Resource Locator. The address that defines the route to a file on the Web or any other internet facility. URLs are typed into the browser to access Web pages, and URLs are embedded within the pages themselves to provide the hypertext links to other pages. For example, the United States Patent and Trademark Office uses www.uspto.gov/index.htm as the address of its home page.

Browser: A program that lets a user look through a set of data. A browser displays documents on the internet and the World Wide Web to a user's computer linked to the internet.

Figure 1:
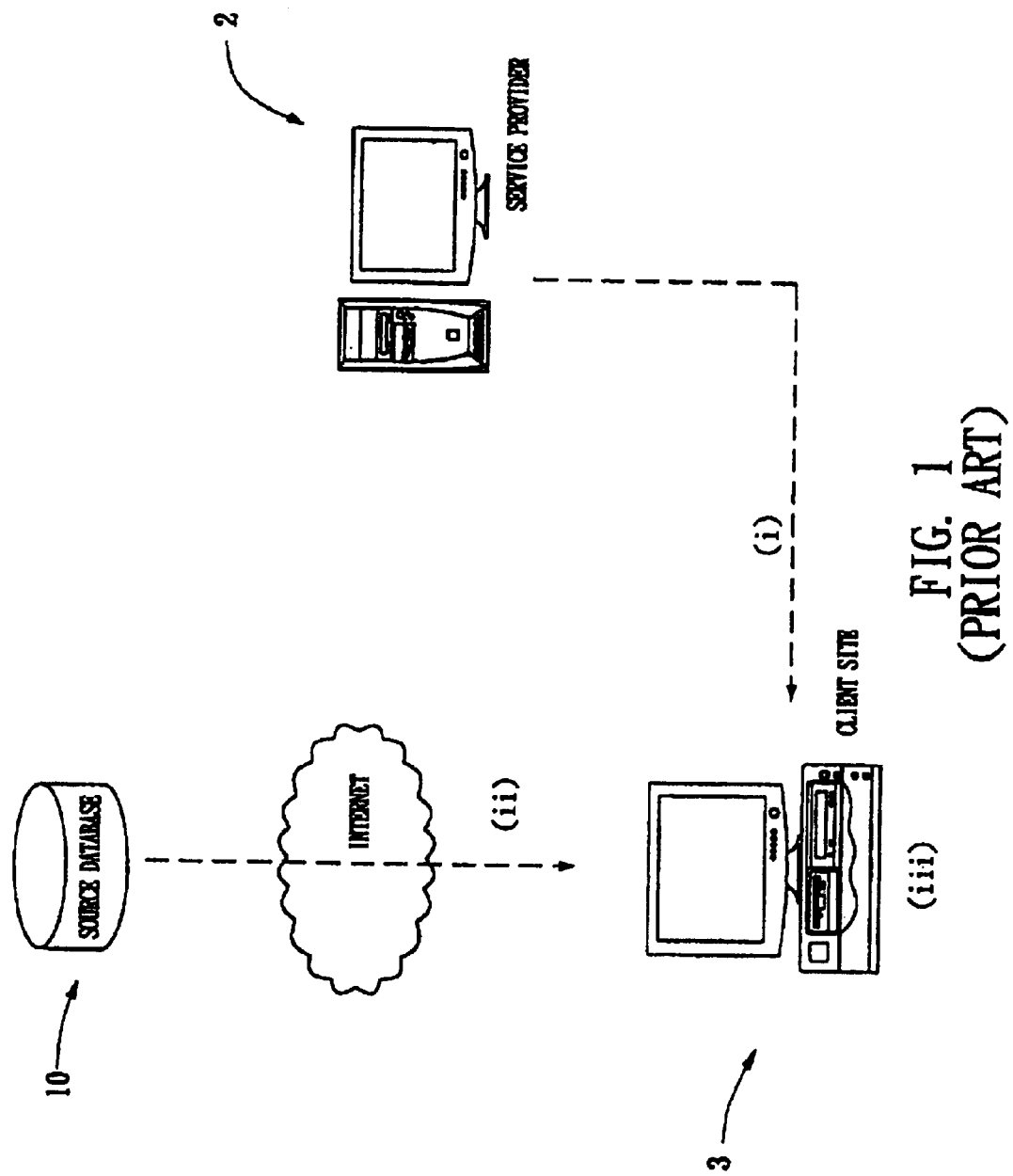
FIG. 1 is a schematic view showing a conventional service model for providing a data analysis.
Figure 2:
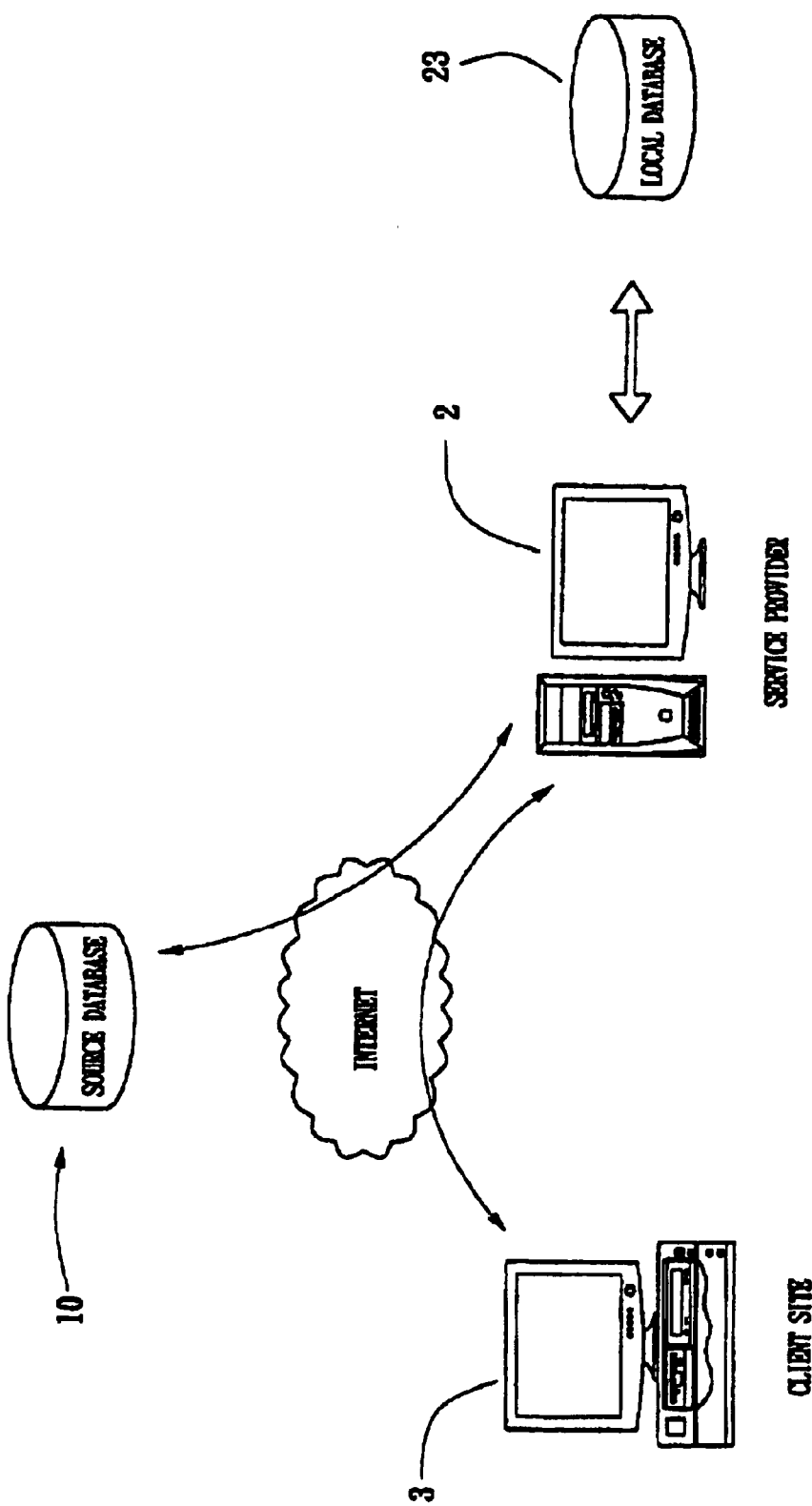
FIG. 2 is a schematic view of a system for an online agency service of data mining and analyzing in accordance with the present invention.

Referring to FIG. 2, a system for an online agency service of data mining and analyzing (herein simplified as the agency service system) is shown. The agency service system comprises a source database 10 which may be linked to a Web site, a service provider 2, and a client site 3. A local database 23 is installed in the site of the service provider 2 for storing data extracted from the source database 10. The service provider 2 herein is a server which contains executable software stored therein. A service procedure of the agency service system may be separated into the following steps: (1) The client site 3 sends a data-analysis request to the service provider 2. (2) The service provider 2 converts the data analysis request into a standard format of query information. (3) The service provider 2 sends the standard format of query information to the source database 10. (4) A searching engine attached to the source database 10 performs a data search and obtains a plurality of records of source data meeting the standard format of query information. (5) The service provider 2 performs extraction and classification on the obtained source data and downloads the extracted data to related columns of the local database 23. (6) The service provider 2 performs analysis on the data stored in the local database 23 and obtains an analysis report. (7) The service provider 2 sends the analysis report to the client site 3 and charges the client site 3.

Therefore, the agency service system of the present invention can serve the client for online data searching, downloading, and analysis.

Figure 3:
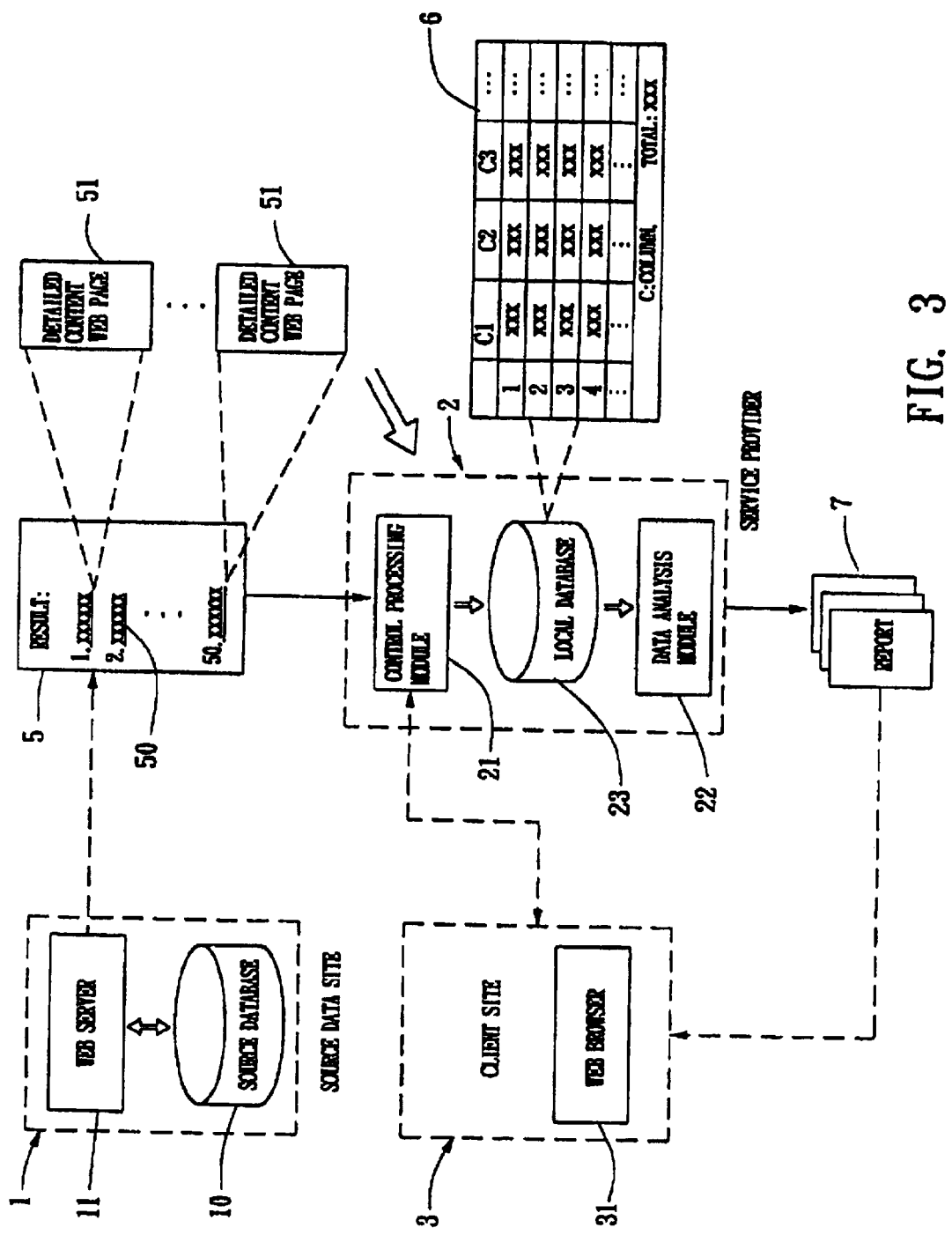
FIG. 3 is a detailed view of FIG. 2.

Referring to FIG. 3, a detailed system for an online agency service of data mining and analyzing in accordance with the present invention is shown. The system comprises a source data Web site 1, the service provider 2 and the client site 3. The source data Web site 1 comprises a Web page server 11 and the source database 10. The source database 10 stores a considerable amount of original data which may be presented via a Web page (coded by HTML) by the Web page server 11 upon request from internet users. Any personal computers installed with a browser and linked to the internet may visit the Web server 11 and obtain the required original data. The service provider 2 comprises a control processing module 21, a data analysis module 22 and the local database 23. The client site 3 comprises a Web page browser 31.

When the source data Web site 1 receives a data search request with a standard format of query information sent from the service provider 2, it will present a Web page 5 via the Web page server 11. The Web page 5 contains a plurality of hypertext records 50 each of which is linked to a Web page 51 with detailed content. The control processing module 21 of the service provider 2 automatically extracts the search result, calculates the number of the records and the required charge, and informs the client site 3 of the records and required charge for the client site's confirmation of request.

Figure 4:
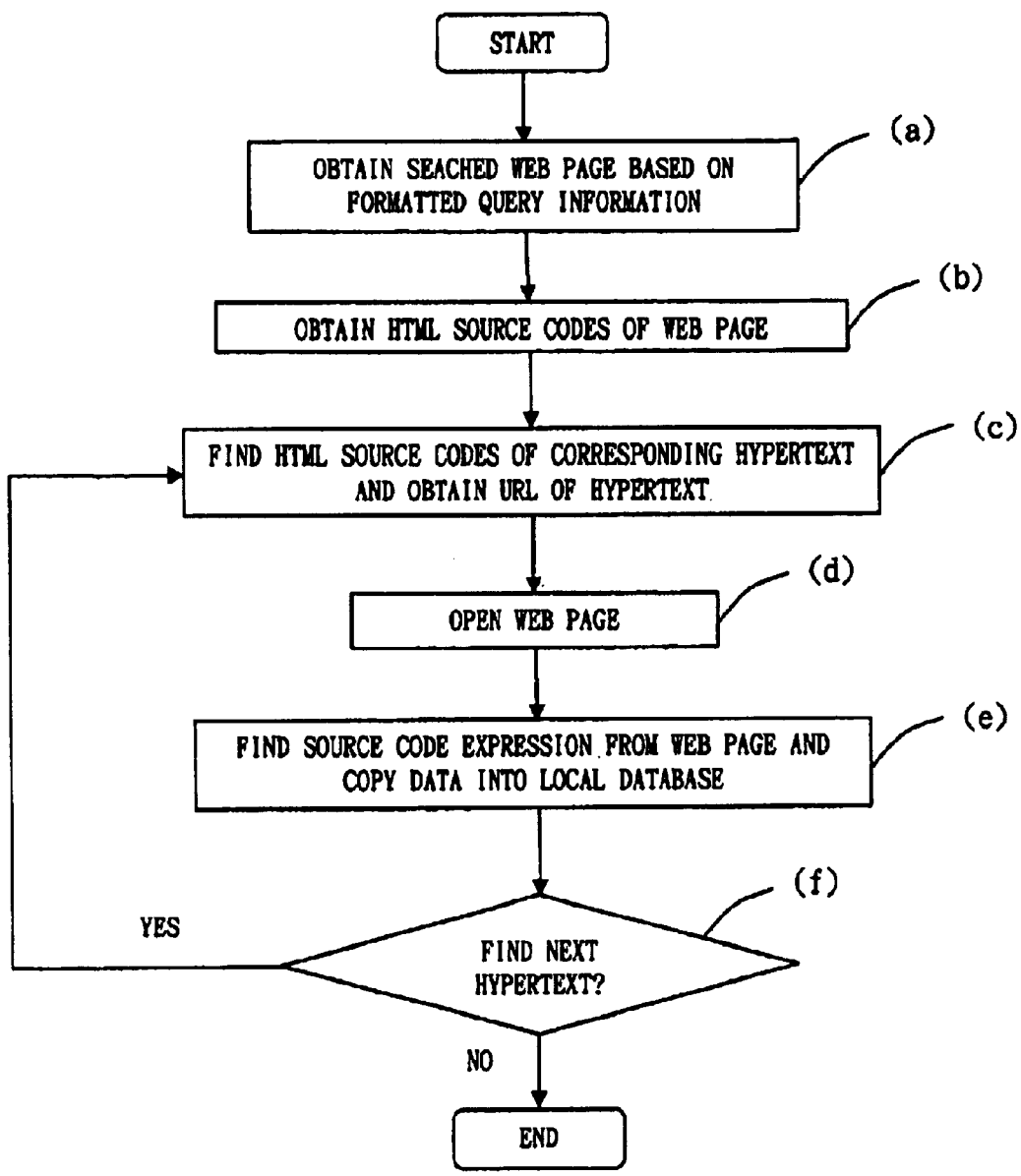
FIG. 4 is a flow chart for online data mining in accordance with the present invention.

The control processing module 21 downloads and analyzes the detailed content from each of the Web pages 51 upon receipt of the confirmation of request. FIG. 4 is a flow chart for online data mining. For explanation purposes, a search example is illustrated. The data mining includes the following steps:

(a) Obtain the searched Web page 5 based on the formatted query information. Referring to FIG. 5, a search result (Web page 5) taken from the United States Patent and Trademark Office Web site (http://www.uspto.gov) by the query information "ICL/G06F" is obtained. For simplification, the search result is only shown partially. The patent records meeting the query information are shown by hypertext 50. Each hypertext record is linked to a corresponding Web page including detailed content of a specific patent specification.

(b) Obtain the HTML source codes of the Web page 5. Referring to FIG. 6, a portion of the HTML source codes of the Web page 5 of FIG. 5 is shown.

(c) Find the corresponding HTML source codes meeting the hypertext 50 and obtain the URL corresponding to the hypertext 50. Referring to FIG. 6, one of the URLs meeting a specific hypertext 50 is quoted as—<AHREF=http://patents.uspto.gov/cgibin/ifetch4?ENG+PATBIB-1999–2000+0+1+165850+F+1+19984+1+ICL%2fg06f/A>—.

Figure 7:
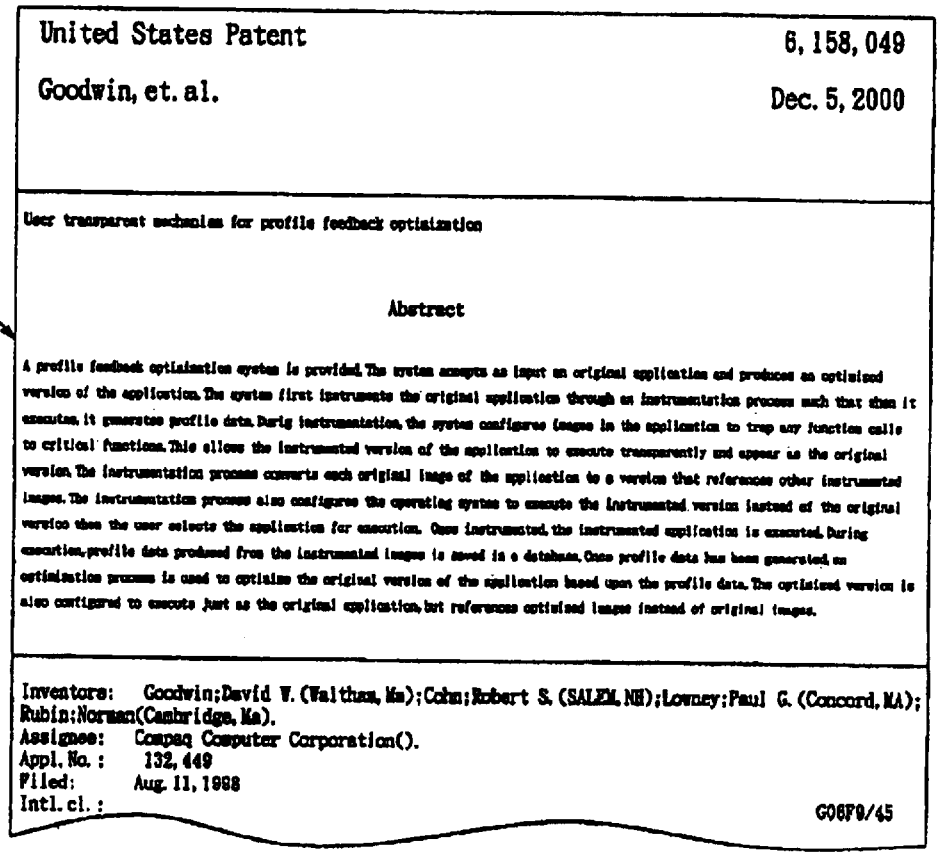
FIG. 7 is a partial view of the Web page linked by the hypertext of FIG. 5.

(d) The control processing module 21 opens the corresponding detailed content Web page 51. FIG. 7 is the detailed content Web page 51 corresponding to the URL shown in step (c). FIG. 8 is a portion of the HTML source codes corresponding to the Web page 51 of FIG. 7.

(e) Find from the Web page 51 the corresponding source code expression meeting the predetermined column name of the local database, and copy the data subsequent to the code expression into the local database 23. For example, the local database 23 has a predetermined column name "Inventor" which has a corresponding record cell for storing the corresponding data fetched from the source HTML data of the Web page 51 subsequent to the data expression "Inventor". In this example, the control processing module 21 will fetch the four data expressions "Goodwin; David W.", "Cohn; Robert S.", "Lowney; Paul G.", and "Rubin; Norman". Similarly, other data corresponding to other predetermined column names may be fetched from the Web page 51 into corresponding cells of the local database 23, thereby forming a final table of data records 6 as shown in FIG. 3.

(f) Find the next hypertext 50 from the Web page 5. If the next hypertext 50 exists, the procedure returns to step (c); otherwise the procedure is ended.

All the detailed contents linked by the hypertexts 50 of the Web page 5 may be selectively extracted to the related column cells of the local database 23 after performing the above procedure. With the above procedure, a search to the remote source database 10 may be performed and the searched data may be automatically fetched by the control processing module 21 from the source database 10 to the local database 23 with a predetermined format.

Figure 9:
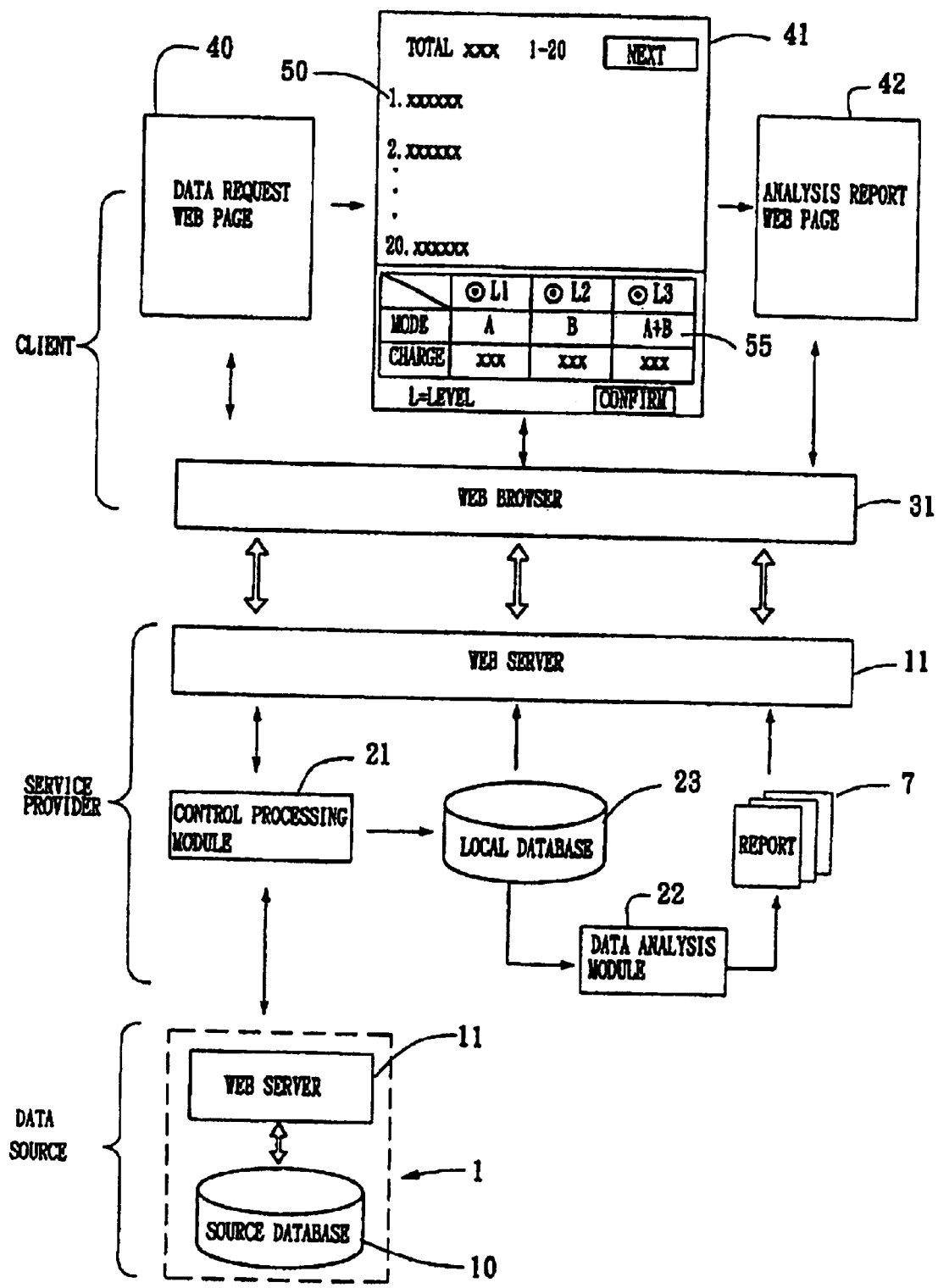
FIG. 9 is a flow chart of a online transaction method for the system of the online agency service of data mining and analyzing in accordance with the present invention.

Referring to FIG. 9, a transaction mechanism of the system for an online agency service of data mining and analyzing is shown. This transaction mechanism comprises the client site 3 having the Web browser 31, the service provider 2 having the Web server 11, and the source data Web site 1. A client (not shown) can visit the Web server 11 of the service provider 2 via the Web browser 31 of the client site 3, and input request information in a request Web page 40, whereupon the request information is acknowledged by the Web server 11. The control processing module 21 processes the request information, converts the information request into a formatted query expression and uses the formatted query expression to search from the source data Web site 1. The control processing module 21 automatically generates a request confirmation Web page 41 after performing the search based on the formatted query expression. The request confirmation Web page 41 contains all the searched hypertexts 50 and a table 55 showing charges of different analysis modes. The charge for each analysis mode based on the searched hypertexts 50 may be calculated by the following formula:

Charge=(total records×record price)×weight of mode;

wherein the total records represents the total number of the searched hypertexts, the record price is the price for each record, and the weight of mode represents the weight for each specific mode. The weights of different analysis modes are different based on the load duty the service provider 2 has to perform. More specifically, the loads for different modes are different based on an analysis level of each search. For better understanding, an example having three selectable modes is discussed herein. The selectable analysis modes may be A, B, or A+B mode, and each mode has respectively the weight of 1, 1.2, and 1.5. Suppose the number of the searched records is 200, the price for each record is 3 dollars, and the selected analysis mode is mode B, then the charge is 720 dollars (200×3×1.2=720).

After the client has selected the analysis mode and clicked the icon for confirmation of request in the table 55, the control processing module 21 will fetch the detailed data from the source database 10 to the local database 23 and form the final table 6 of data records. The data analysis module 22 performs analysis on the data records of the final table 6 based on the selected analysis mode and generates an analysis report 7. The analysis report 7 will be shown on a report Web page 42 available to the client. Finally, the client pays the charge to the service provider 2 and finishes the transaction.

While the present invention has been described with reference to a specific embodiment, the description is illustrative of the invention and is not to be construed as limiting the invention. Therefore, -various modifications to the present invention can be made to the preferred embodiment by those skilled in the art without departing from the true spirit and scope of the invention as defined by the appended claims.

What is claimed is:

1. A system for an online agency service of data mining and analyzing, comprising a source database, a service provider, and a client site, wherein:

the source database stores source data and is linked to a Web server;

the client site comprises a module for sending and receiving information, wherein:

the client site sends a data analysis request to the service provider and the service provider fetches source data from the source database based on the data analysis request, analyzes the fetched source data and presents an analysis report to the client site; and the service provider accesses the source database by visiting the Web server associated with the source database, and the service provider comprises:

a control processing module for extracting searched results, calculating a total number of records and a required charge according to the data analysis request sent by the client site, and informing client site of the records and required charge in order to obtain the client site's confirmation of its data analysis request;

a local database for storing data extracted from the source database; and a data analysis module for performing analysis on the data stored in the local database based on the data analysis request sent by the client site, and for generating an analysis report.

2. The system as claimed in claim 1, wherein the module for sending and receiving data is a Web browser.

3. The system as claimed in claim 2, wherein the service provider comprises a Web server which may be visited by the Web browser of the client site.

4. The system as claimed in claim 3, wherein the source data stored in the source database are patent specifications.

5. A method for an online agency service of data mining and analyzing, the method utilizing a service provider comprising a control Processing module for processing data stored in a source database and obtaining data records, and a data analysis module for analyzing data records stored in a local database, the method comprising:

(a) a client site sending a data analysis request to a service provider via a Web browser;

(b) the service provider accessing a source database by visiting a Web server associated with the source database for data mining based on the data analysis request;

(c) the service provider obtaining a plurality of data records from the source database meeting the data analysis request, said data records being linked by a corresponding number of hypertexts located in search result Web a and each data record being presentable by a corresponding Web page with detailed content, and storing the data records in the local database, comprising;

(c1) obtaining the source codes of the search result Web page;

(c2) finding the source codes of the hypertext in order to obtain the address linked to the hypertext;

(c3) the control processing module opening the corresponding detailed content Web page based on the address linked to the hypertext;

(c4) finding a corresponding column name in the source codes of the source data Web page identical to a predetermined column name of the local database and writing data corresponding to the to the local database; and (c5) checking whether there is a next hypertext from the search result Web page; if positive, if procedure returns to step (c21), otherwise the procedure goes to step (d);

(d) the service provider analyzing the data records stored in the local database and generating an analysis report; and (e) the service provider presenting the analysis report to the client site.

6. A transaction method for an online agency service of data mining and analyzing, the method utilizing a service provider comprising a control processing module for processing searched data records and obtaining formatted data records which are then written into a local database, and a data analysis module for analyzing the formatted data records stored in the local database, the method comprising:

(a) a client site sending a data analysis request to the service provider, wherein the client site has a Web browser for sending the data analysis request to the service provider;

(b) the service provider performing a search from a source database based on the data analysis request and obtaining a plurality of searched data records meeting the data analysis request, wherein the service provider accesses the source database by visiting a Web server associated with the source database, the searched data records are linked by corresponding hypertexts which are located in a search result Web page and each searched data record is presentable on a Web vane;

(c) the service provider calculating a required charge according to a total number of the searched data records;

(d) the service provider providing the searched data records and required charge to the client site so that the client site can perform a confirmation of request;

(e) the service provider, after receiving a confirmation of request from the client site, processing the searched data records and obtaining a plurality of formatted data records which are then written into the local database, comprising;

(e1) obtaining source codes of the search result Web page:

(e2) finding source codes corresponding to the hypertext for obtaining an address linked to the hypertext;

(e3) the control processing module opening the corresponding source data Web page based on the address linked to the hypertext;

(e4) finding a corresponding column name from the source codes of the source code Web page based on a predetermined column name of the local database and writing corresponding source data attributed the column name to the local database; and (e5) finding a next hypertext from the search result Web page; if the next hypertext exists, the procedure returns to step (e2), otherwise the procedure goes to step (f);

(f) the service provider analyzing the formatted data records stored in the local database and automatically generating an analysis report; and (g) the service provider sending the analysis report to the client site.

7. The transaction method as claimed in claim 6, further comprising a step in which the client site pays the charge calculated in step (c) to the service provider.

* * * * *